United States Patent [19]

Whitford

[11] 4,306,179
[45] Dec. 15, 1981

[54] ELECTRIC POWER CONTROL SYSTEM

[75] Inventor: Darryl R. Whitford, Adelaide, Australia

[73] Assignees: The Flinders University of South Australia; The Minister of Transport, State of South Australia, both of Adelaide, Australia

[21] Appl. No.: 28,219

[22] Filed: Apr. 9, 1979

Related U.S. Application Data

[63] Continuation of Ser. No. 777,414, Mar. 14, 1977, abandoned.

[30] Foreign Application Priority Data

Mar. 12, 1976 [AU] Australia .............................. PC5192

[51] Int. Cl.³ .............................................. H02P 7/00
[52] U.S. Cl. ..................................... 318/139; 318/269;
318/347; 318/349; 318/376; 318/432
[58] Field of Search ............... 318/139, 269, 332, 347,
318/348, 349, 375, 376, 476, 432, 291, 293

[56] References Cited

U.S. PATENT DOCUMENTS

| 3,845,835 | 11/1974 | Petit | 320/61 |
|---|---|---|---|
| 3,855,511 | 12/1974 | Smith | 318/332 |
| 3,923,116 | 12/1975 | Thompson et al. | 318/139 |
| 4,044,287 | 8/1977 | Ratzel | 318/432 |
| 4,082,988 | 4/1978 | Reime et al. | 318/139 |

Primary Examiner—Stanley J. Witkowski
Assistant Examiner—Eugene S. Indyk
Attorney, Agent, or Firm—Charles A. Blank

[57] ABSTRACT

An instantly variable constant current control is interposed between a bank of batteries and a motor. The variable constant current control comprises a series pass transistor operating in a linear mode and controlled by a reference voltage from a potentiometer coupled to an accelerator pedal. Correction voltage from the series pass transistor circuit is proportional to current. The accelerator reference voltage and the current correction voltage are compared in a linear operational amplifier which controls the "on" resistance of the series pass transistor.

10 Claims, 4 Drawing Figures

ELECTRIC POWER CONTROL SYSTEM

This is a continuation of application Ser. No. 777,414, filed Mar. 14, 1977 now abandoned.

This invention relates to a system for the control of current and thereby of torque of a D.C. electric motor such as would be used in an electric vehicle.

BACKGROUND OF THE INVENTION

Traction motors for prior art electrically driven vehicles have usually been direct current series motors which have an approximate inverse relation between torque and speed, the motors therefore providing the high torque whenever it is required at start but high speed and low torque under running conditions. However the power input is the product of current and voltage while power output is measured in foot pounds per minute. Consequently on start and at low speed series motors are particularly inefficient, they draw extremely high currents and if the power source is a battery bank, they can and often do damage the batteries. High motor efficiency at all speeds is a most desirable feature for battery driven vehicles if a reasonable range of travel is to be achieved.

A printed circuit motor is a highly efficient motor of relatively low weight, and has a low inductance. The concept of the series motor for traction purposes is completely unsuited for use with a printed circuit motor. The torque of a printed circuit motor is a function of the current (being approximately proportional), and one of the objects of this invention is to provide a system which will match available voltage to the motor voltage requirement, (although the invention is not necessarily limited to use with a printed circuit motor).

If for example a motor torque is maintained constant and speed increases, the horsepower output increases, and thus there is a need to provide voltage control means which will increase the voltage. However, in a vehicle it is required to vary torque (current) as well as voltage, and desirable to avoid "jumps" as further batteries are switched in, and a further object is to provide means for achieving this smooth and efficient control of motor torque.

BRIEF SUMMARY OF THE INVENTION

In this invention a control system provides a variable constant current control for a D.C. motor in either the power output mode, or the regenerative mode when the motor runs as a generator.

An instantly variable constant current control is interposed between a bank of batteries and a motor. The variable constant current control comprises a series pass transistor operating in a linear mode and controlled by a reference voltage from a potentiometer coupled to an accelerator pedal. Correction voltage from the series pass transistor circuit is proportional to current. The accelerator reference voltage and the current correction voltage are compared in a linear operational amplifier which controls the "on" resistance of the series pass transistor.

In one aspect of this invention there is provided an electric power control system useful for controlling the torque of a direct current electric motor which forms portion of an electrical power circuit the power of which is derived from a bank of batteries, comprising a current sensing device in said power circuit having an output which constitutes a correction voltage which is proportional to current flow, a variable reference voltage control device having control means operable to vary said reference voltage, a linear operational amplifier coupled to both said correction voltage and reference voltage and having an output voltage which varies in response to differences between said correction and reference voltages, and a series pass transistor in said electrical power circuit, the equivalent resistance of which is a function of said amplifier output voltage, arranged so that for any one reference voltage the current flow through said electrical power circuit is approximately constant.

When the device is utilised on an electric vehicle, the "accelerator" pedal of the vehicle can be coupled to a potentiometer so as to vary the reference voltage, thereby providing current (or torque) control means for the motor. Further sensing means which sense the voltage drop across the transistor thereby sense the difference between applied voltage at any one instant and motor back E.M.F., switching into or out of the circuit one of the batteries of the bank (in a further aspect of the invention).

Control of D.C. motors is usually resistive, and consequently in prior art high voltage drops across resistors resulted in low efficiency. However by limiting resistance losses to a voltage range represented by only one battery of a bank of batteries, efficiency loss is thereby similarly limited. Charging of the batteries when the motor generates is similarly improved in efficiency.

Fast acting switches have been used heretofore, and solid state switching devices have also been contemplated (if not used). One of the difficulties encountered is that it is possible to short circuit an accumulator in the event of malfunction, and in a further aspect of this invention there is provided a system wherein this danger is largely reduced.

When accumulators of the lead/acid type are utilised, electrolyte concentration varies as discharge takes place. Higher discharge efficiency will occur if an accumulator is allowed at least a short period of rest so that electrolyte diffusion can occur, and in a further aspect of this invention there are provided improvements whereby a bank of accumulators are scanned so as to provide equal energy sharing of all accumulators but allow some at least of the accumulators to rest periodically.

In a further aspect of this invention, the control system includes two units, one being a pre-selector unit, and the other a current control unit, the pre-selector unit comprising a scanning device which periodically scans the batteries of the bank, interconnecting some but not all of those batteries into a current supply network which supplies a current control unit, the current control unit comprising a constant current control circuit which is itself variable and which is interlocked with the pre-selector unit to vary the number of cells placed into circuit at any one time in response to motor demand, the motor being portion of the current control circuit.

The device can be alternatively arranged as a mechanical switching device or as an electronic logic device, in each case controlling contactors which can themselves be mechanical or electric, and two embodiments of the invention are described hereunder in some detail.

Figure 1:
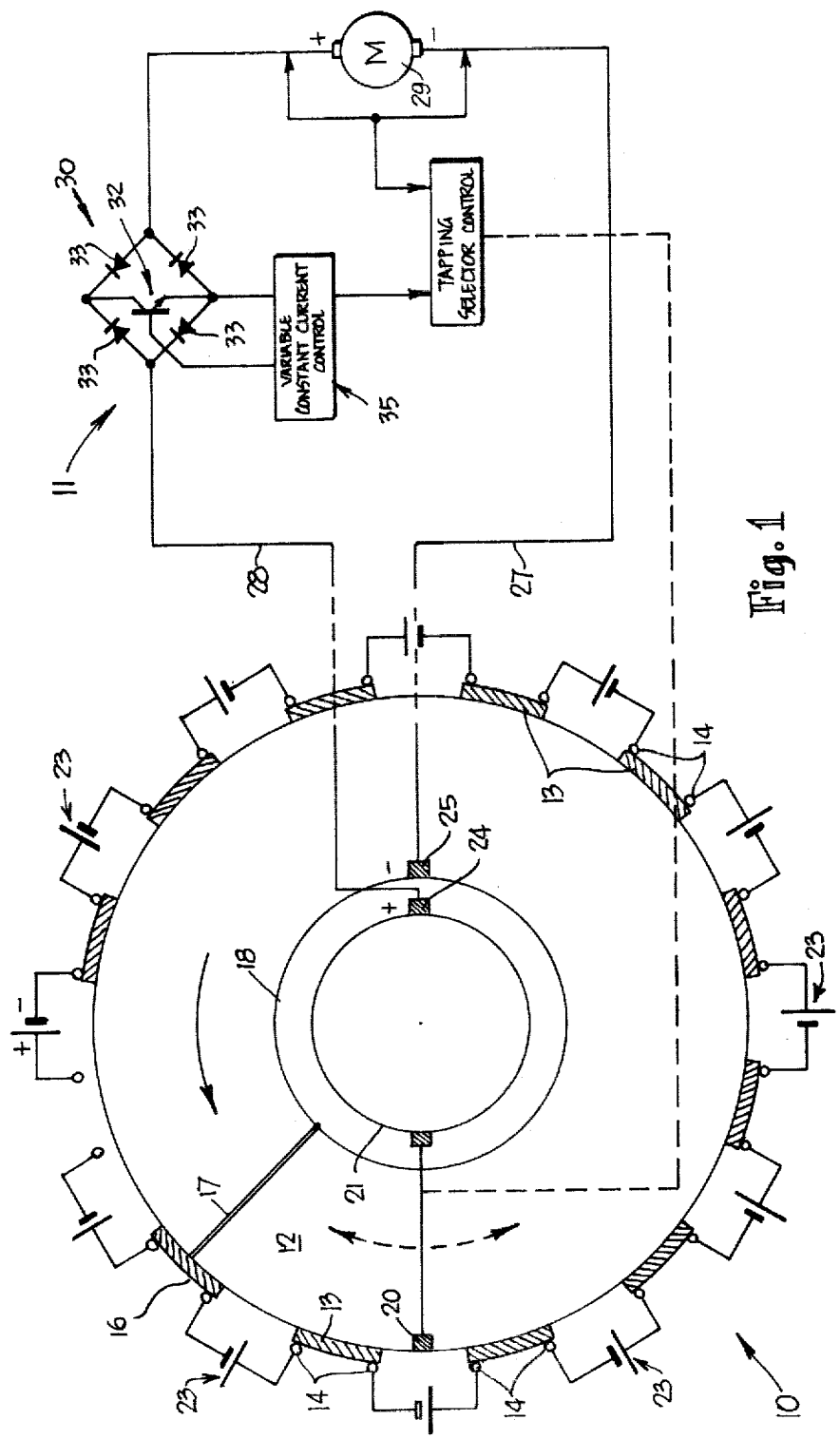
FIG. 1 is a simplified schematic block diagram which illustrates a mechanical switching arrangement according to a first embodiment.
Figure 2:
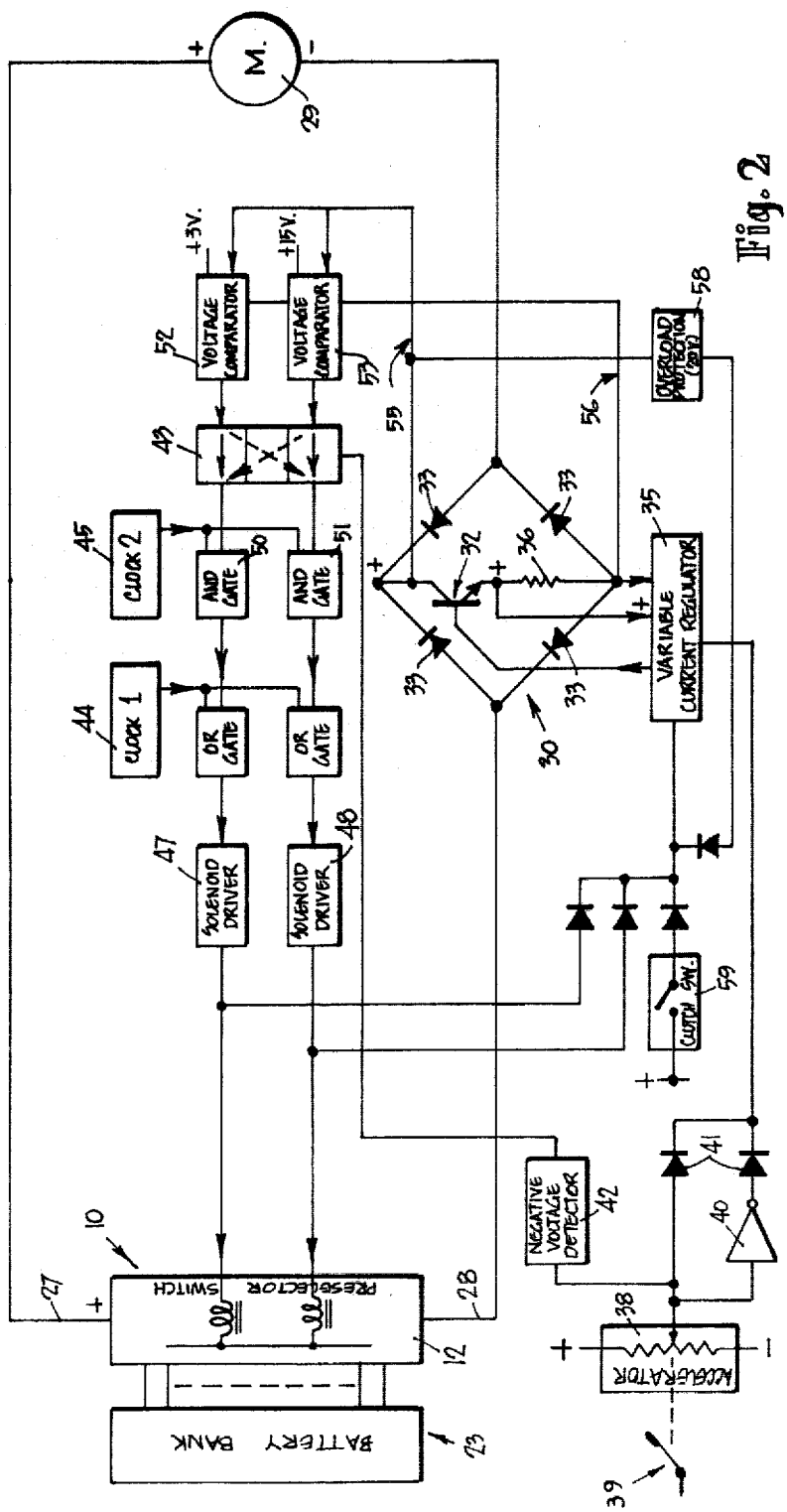
FIG. 2 is a schematic block diagram of the general circuit of the power control system associated with the device of FIG. 1.

Referring first to the embodiment illustrated in FIGS. 1 and 2, it will be seen that the system includes two units, a pre-selector unit 10 and the current control unit 11.

The pre-selector unit 10 comprises a rotary disc assembly 12 having bridging segments 13 its periphery, the segments 13 joining adjacent pairs of stationary contacts 14 in different groups as the disc steps from one position to another rotationally spaced position. It will be seen that one pair of contacts 14 are not joined by the bridging segments 13, and the "gap" rotates along with disc assembly 12. Also one of the segments 13 which is designated 16 is permanently connected by conductor 17 to one ring 18 of a slip ring assembly.

A selector contact 20 is capable of selecting any of the segments 13 and is connected to another slip ring 21 of the slip ring assembly. The position of contact 20 in relation to segment 16 will therefore determine the number of batteries 23 which are connected to the current control unit 11 via brushes 24, 25 of the slip ring assembly.

The rotating disc assembly rotating segments 13, selector contact 20 slip ring assembly is periodically rotationally stepped one position in a uniform direction, thus scanning all the batteries 23 of the bank of batteries and providing an equal energy sharing of all batteries 23. In this embodiment the batteries 23 are all twelve volt batteries.

The selector voltage from the slip ring assembly, is coupled through brushes 24, 25 and conductors 27, 28 to a direct current motor 29 via an adjustable constant current control circuit 30. The power of the direct current motor is a function of the current through it, and therefore control circuit 30 will control the effective torque of the motor. In this embodiment motor 24 is a printed circuit motor.

The control circuit 30 comprises a uni-directional transistor current device 32 which is placed in a bridge assembly consisting of four solid state diodes 33.

If the selected voltage is greater than the motor EMF, then a control current will flow through the motor 29 inducing mechanical power from the motor.

If the motor EMF is greater than the selected voltage, then a controlled charging current will flow through the storage batteries 23, producing a counter torque to the motor 29. This occurs for example when an "accelerator" pedal is released.

The control of the pre-selected voltage of the pre-selector unit 10 is effected by sensing the difference between applied voltage and the back EMF of the motor 28. For discharge from the batteries 23, the selected voltage is the addition of the voltages of one or more batteries higher than the back EMF. To recharge the batteries 23, the selected voltage is the addition of the voltages of one or more batteries lower than the back EMF of the motor.

Since the current control unit (which is a power loss device) has a voltage drop across it which is usually less than the voltage of one battery, the effective electrical efficiency of the whole control system is normally high. In this respect this invention compares very favourably with a series wound electric motor type of power transmission.

Since not all of the batteries 23 are in circuit at any one time, some of the batteries are in a period of rest. If the batteries are lead/acid accumulators, this is beneficial allowing electrolyte diffusion to occur providing a higher discharge efficiency.

The number of batteries 23 employed may be greater than required to provide the required voltage to drive the D.C. motor 29.

FIG. 2 illustrates in more detail the motor control circuit which is shown only in general block diagram in FIG. 1.

In FIG. 2, the control of the motor current is effected by the series pass transistor 32 (in the bridge circuit) which is controlled by a variable current regulator 35 which is a linear operational amplifier. The amplifier selected in this embodiment is a Fairchild 741.

This regulator compares a reference voltage input from an accelerator potentiometer 38 with the voltage produced across a resistor 36 which forms portion of a motor current sensor, and is in the emitter circuit of the series pass transistor 32. The voltage across resistor 36 is proportional to the current passing through transistor 32 and through the motor 29.

If a reference voltage is greater than the voltage across resistor 36, transistor 32 will be driven harder into conduction (that is, its equivalent resistance is lowered) until the current through resistor 36 produces a voltage comparable with the reference input.

If the reference voltage across resistor 36 is lower, the transistor 32 will have its equivalent resistance raised until the resistor voltage is again comparable with the reference voltage.

Thus the current through the transistor 32 will be in proportion to an input reference voltage so long as there are sufficient batteries 23 of the bank switched in to supply the power required.

The reference voltage is derived from a potentiometer 38 controlled by a foot pedal 39 which is comparable in usage to the accelerator of an internal combustion engine driven vehicle, the output of which is either negative or positive voltage according to which side of centre the wiper is located. As a reference input is always required to be positive, an inverting amplifier 40 and diode steering 41 is used to achieve uniform polarity for the reference voltage, irrespective of the position of the wiper.

A negative voltage detector 42 gives an output only when the accelerator wiper is on the negative side of the centre of the potentiometer 38, and this causes actuation of a sense change switch 43.

The accelerator can therefore give uniform current control on each side of the centre position, and also give a signal as to which side of zero it is operating from. Thus by using the negative voltage detector to control the voltage output of the pre-selector unit, the accelerator can be used to control the re-generation current from the mid to off position and the output current from the mid to full on position.

The pre-selector switch 10 is controlled by two solenoids, much in the same way as a uni-selector. One of the two solenoids rotates the disc assembly 12 and the other positions the selector contact 20, which can be identified in the block diagram of FIG. 1. The solenoids are driven by a driving unit which gives a uniform pulse width output when the input receives a clock strobe pulse.

Two electronic clocks designated 44 and 45 are provided. Clock 44 runs at approximately 0.2 HZ and drives both solenoid drivers simultaneously. The relative position between the selector contact 20 and conductor 17 is therefore retained during the stepping, the function of which is to equalise the drain on the accumulator cells.

Either of two solenoid drivers 47, 48 can be activated by clock two (designated 45) which runs at approximately 20 Hz, providing the other input of a respective AND gate 50, 51 is also being simultaneously driven by the output of a respective voltage comparator 52, 53. The output of the voltage comparators 52, 53 will only be active if the voltage input between conductors 55, 56 (which corresponds to the voltage across the series pass transistor 32 and resistor 36) is less than 3 volts or is greater than 18 volts, respectively.

If therefore, the voltage between conductors 55, 56 is less than 3 volts, selector contact 20 will be advanced forward one position, resulting in the voltage between conductors 55, 56 now being 12 volts (1 battery unit) plus 3 volts. This potential difference is within the voltage comparators operating zones so neither output will be activated.

If however the voltage between conductors 55, 56 becomes greater than 18 volts the disc assembly 12 will be activated, effectively removing 12 volts.

The voltage between conductors 55, 56 therefore remains within the region of 3 to 18 volts, the pre-selector voltage being greater by this amount than the motor voltage. As the motor voltage varies, the pre-selector voltage will also vary as required.

To regenerate, it is only necessary that the pre-selector voltage be from 3 to 18 volts less than the motor voltage. This is achieved when the output of accelerator potentiometer is on the negative side of centre, which reverses the voltage comparators. Thus if the voltage across transistor 32 is less than 3 volts the pre-selector will step down one battery 23, that is 12 volts, and if the voltage across transistor 32 is greater than 18 volts it will step up one 12 volt position.

During the stepping of the pre-selector switch the series pass transistor 32 is turned to the off state, thus relieving the contacts of the switch of having to handle current during switching. The contacts are therefore stationary when current is flowing.

Transistor 32 is also turned off if the voltage across it exceeds 20 volts by voltage overload device 58, thus ensuring protection from over dissipation should a malfunction occur.

Transistor 32 can also be turned off from an external switch 59, which is analogous to a "clutch" control of an IC engine driven vehicle if it is necessary to remove power from the motor shaft.

An alternative to the mechanical pre-selector is the use of semi-conductors to perform the switching.

Thus switching may be performed by triacs to allow bidirectional current flow. SCRs or transistors may be used if single direction current flow is required.

Control of the elements in the switching configuration can be similar to that described to a mechanical pre-selector, except that the driving circuit must retain a memory of the sequence (this is stored as a function of the mechanical position of the mechanical units). For example, the output of the OR gates could drive a counter each, the outputs being decoded and driving switching elements.

One advantage of this invention is that the system enables a high voltage battery pack to be recharged by a lower, safer voltage, for example fourteen 12 volt batteries requiring in excess of 168 volts to charge can be charged by 48 volts, the pre-selector switch being externally controlled to contact four battery units. The charging current would need to be higher to charge in the same time as a full voltage charger but time sharing should assist in charge acceptance by the cells and therefore increase charge efficiency.

Figure 3:
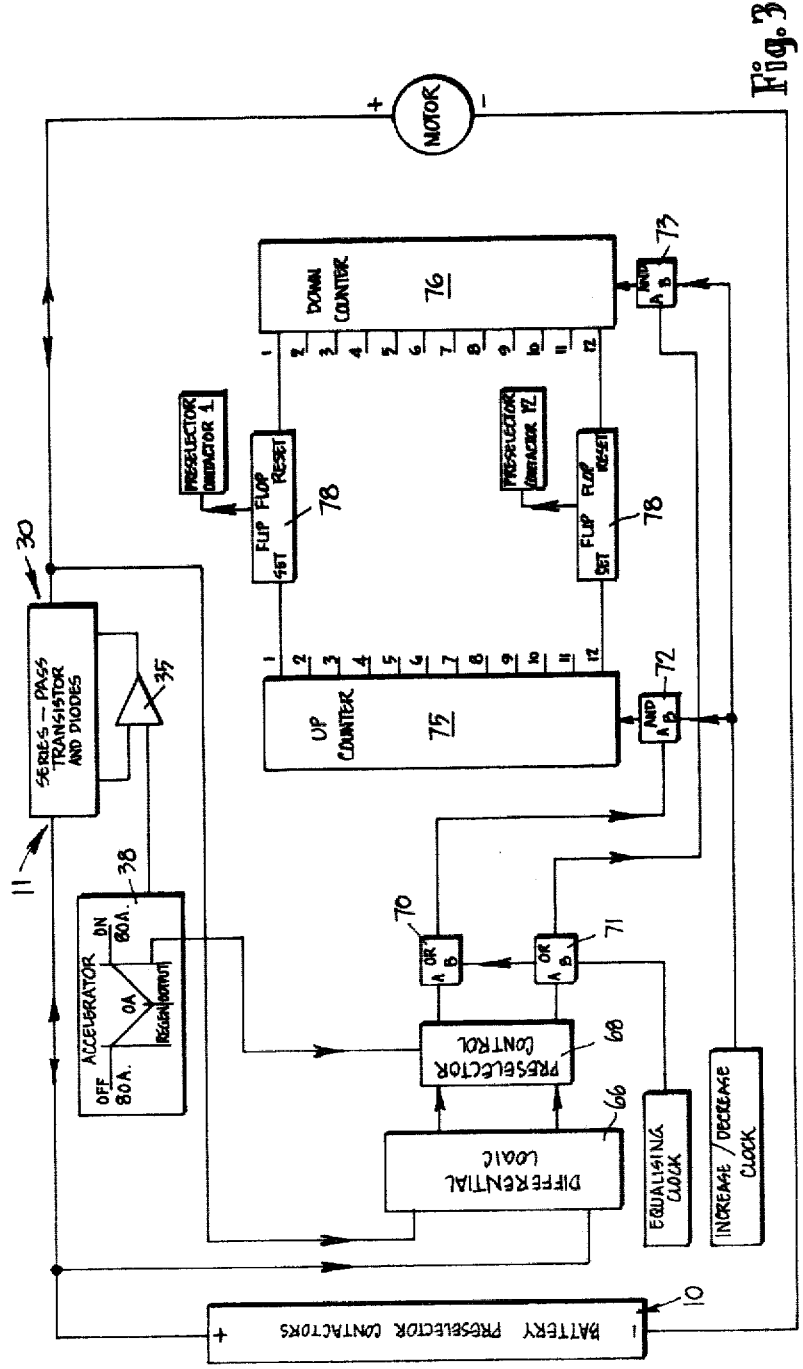
FIG. 3 is a simplified block diagram of a second embodiment which utilises an electronic logic circuit in lieu of the mechanical switching arrangement of FIG. 1.
Figure 4:
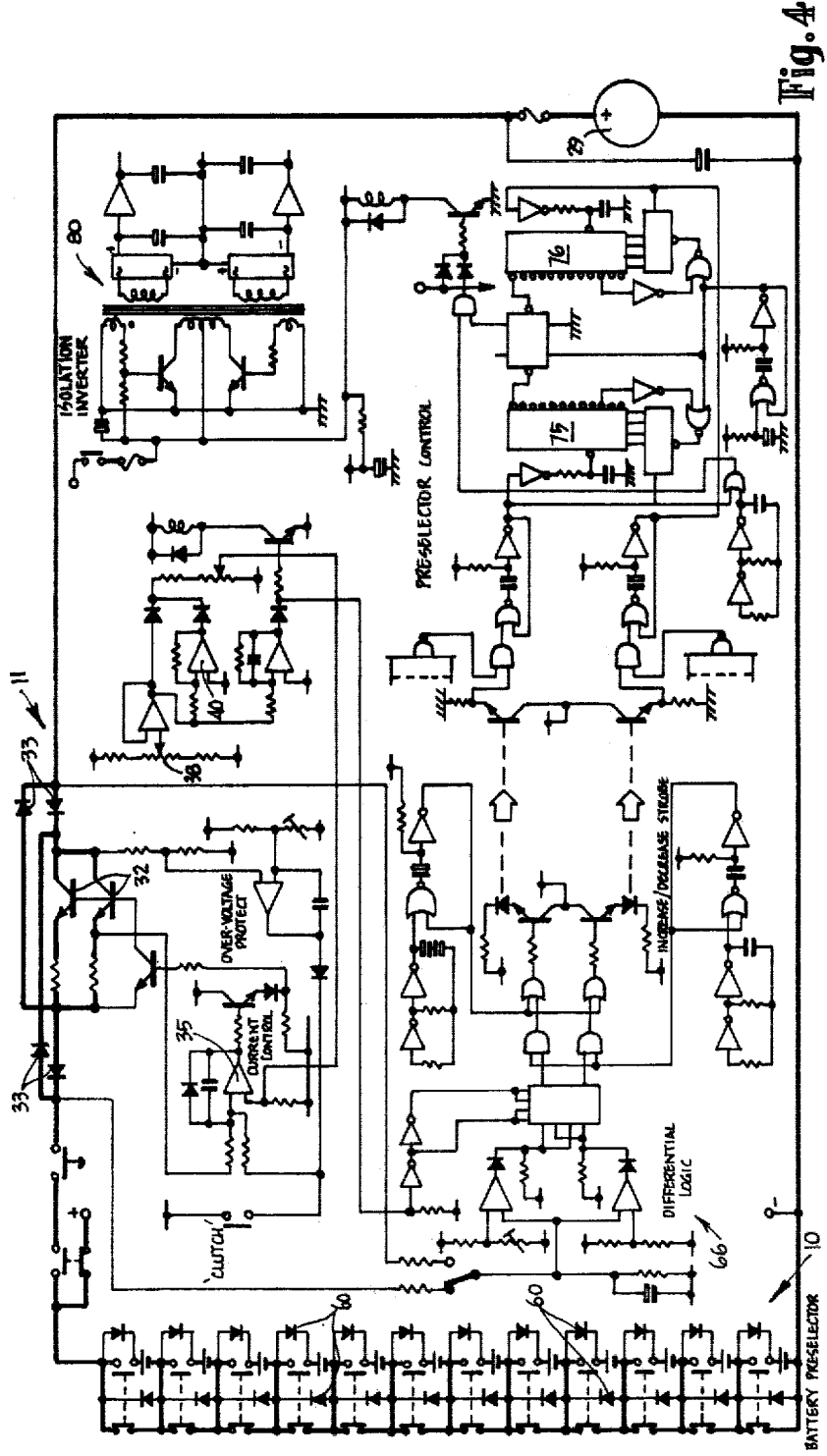
FIG. 4 is the circuit diagram of FIG. 3.

As shown in FIGS. 3 and 4, the mechanical switching arrangement may be replaced with a logic circuit. In the second embodiment illustrated therein, the control system consists of two basic circuits:

the constant current control unit 11 is the actual control element, being driven by the position of the accelerator 38, to control the amplitude of motor current and thus vehicle speed and power. This is a standard constant current supply circuit having series pass transistors 32 in the main motor current circuit 30. These transistors operate as in the first embodiment, in the linear mode, being controlled by an operational amplifier 35 which senses current and accelerator position. The series pass transistors are placed in a diode bridge (diodes 33) to allow regenerative (reverse) current to flow and be controlled. Accelerator control is accomplished by a potentiometer 38 placed across a positive and negative supply voltage. This provides a zero voltage point at the centre of movement, with a linear increasing voltage either side of centre, positive or negative according to the position of the accelerator. Both these voltage ramps control the constant current supply in the 0–80 AMP region. The voltage polarity is decoded to allow correct operation of the pre-selector control.

The preselector control unit 10 is basically a battery switching technique to select battery voltage in 12 volt increments to a maximum of 144 volts. A standard contactor unit is used with each 12 volt battery to switch the battery into circuit or by-pass it. A diode steering circuit 60 is used across each contact to provide a current path whether current is output or regenerative, during contactor change-over.

Control of the contactors is accomplished by a differential logic circuit 66 which senses the difference in voltage between battery voltage and back E.M.F. of the motor. If the accelerator is on the positive voltage ramp, if the battery voltage becomes less than 3 volts more positive than the motor voltage, then the preselector 10 will increase battery voltage by a 12 volt increment. If the battery voltage becomes greater than 18 volts, then a 12 volt unit is removed.

If the accelerator 38 is on the negative voltage ramp, then the logic is reversed, that is, the battery voltage is made less positive than the motor back E.M.F. If the motor E.M.F. becomes less than 3 volts above the battery voltage, then a 12 volt unit is removed from the battery voltage. If the motor E.M.F. increased above 18 volts, then a 12 volt unit is added to battery voltage.

The battery voltage will therefore track the back-E.M.F. of the motor, being more positive than motor voltage if output power is required, or less positive if regeneration is required, the actual difference in voltage appearing across the series-pass transistors of the current control.

The preselector unit 10 is regularly forced to cycle one increment to allow equal discharge of all 12 volt battery units, irrespective of selected voltage. This is accomplished by increasing the selected voltage by 12 volts, then almost simultaneously decreasing 12 volts. Since the logic of the preselector "sees" the contactors as being arranged as a circle, this forces the selected units to increment around the circle.

In normal operation 12 volt units are added to the "front" of the selected segment of units on the "circle" to increase voltage, and are removed from the "back" of the selected segment to decrease voltage, thus again the battery pack is scanned to allow equal discharge.

As in the first embodiment, operation of the contactors is not the actual means of controlling motor current or vehicle speed, but is a secondary function which prime purpose is to select a battery voltage which approximates the back E.M.F. of the motor, and secondly selects a battery voltage which is either greater or less than the motor voltage, to allow output or regeneration current.

The following is a brief description of the preselector logic:

The method of control of the contactors is seen by referring to the block diagram of FIG. 3. The differential logic circuit 66, sensing both motor and battery voltage, can give either a signal to increase the preselector 10 (up) or decrease (down) through a preselector control circuit 68. This logic sense is inverted if regeneration is required. Both the up and down outputs are passed through respective OR gates 70, 71 which allows both up and down logic lines to be energised to allow battery scanning.

The up and down lines then pass via respective AND gates 72, 73 which allows a pulse to pass if the appropriate up or down line is energised. This pulse will cause the appropriate counter 75, 76 to increase its count by one.

Each up or down counter (75, 76) has 12 outputs. If the counter has a count of say 5, then 5 output will be energised. At the beginning of the 13th count, the counters will reset to a count of 1.

The outputs of each counter are connected to the set (enable) or reset (disable) of a flip-flop 78. The output of each flip-flop 78 energises a contactor in the preselector unit 10.

Thus, if a up logic appears, then a up pulse will drive the up counter to its next count (say 2). As the No. 2 output rises in voltage, the flip-flop is set, energising No. 2 contactor in the preselector unit, and increasing battery voltage by 12 volts.

If a down pulse appears to the down counter, then as the counter's respective output goes positive, that flip-flop will reset and de-energise its contactor, removing a 12 volt unit from the battery voltage.

Since both counters count 1→12, 1→12, etc. then it can be seen that if the up counter sets say 1-6 contactors, then the down counter, if resetting, would decrease from 1-6.

To prevent unnecessary operation, the up counter is inhibited from further counting once all 12 flip-flops are set, the down counter inhibited from counting once all flip-flops are reset. This also enables correct sequence of operation between the up and down counters once either the up or down counter has set or reset all the flip-flops.

FIG. 4 shows a detailed drawing of the second embodiment. No attempt has been made to identify every element of FIG. 4, since the detailed selection of elements is within the purview of one skilled in the art. Attention should, however, be drawn to the isolation inverter 80 which provides power for the current control and differential logic circuits from a separate auxilliary battery, but allows electrical isolation of the main battery and motor circuit from the auxilliary battery.

It will be apparent that this invention is not limited to a printed circuit motor, and is applicable also to a compound D.C. motor for example. The voltage can of course be varied within wide limits.

Various modifications in structure and/or function may be made by those skilled in the art to the disclosed embodiments without departing from the scope of the invention as defined by the claims.

I claim:

1. Electric power control system useful for controlling the torque of a direct current electric motor which forms portion of an electrical power circuit the power of which is derived from a bank of batteries, comprising:
   a current sensing resistor in said power circuit having an output voltage which is a correction voltage which is proportional to current flow,
   a variable reference voltage control device having control means operable to vary said reference voltage,
   a series pass transistor in said electrical power circuit and in series with said resistor, and an emitter circuit coupled to said series pass transistor, and
   a linear operational amplifier in the emitter circuit coupled to said series pass transistor, and coupled as a comparator to both said correction voltage and reference voltage and having an output voltage which varies in response to differences between said correction and reference voltages, means interconnecting the output of said amplifier to the base of said transistor such that said output voltage controls the equivalent resistance of said transistor,
   the power circuit being arranged so that for any one reference voltage the current flow through said electrical power circuit is approximately constant, said series pass transistor and said resistor extending diagonally across a diode bridge circuit having four diodes surrounding said transistor and resistor in a configuration which conducts the direct current of said power circuit in one direction through said transistor in both motor and regeneration modes.

2. Electric power control system useful for controlling the torque of a direct current electric motor which forms a portion of an electrical power circuit, the power of which is derived from a bank of at least three batteries, comprising:
   a current sensing device in said power circuit having an output which constitutes a correction voltage which is proportional to current flow
   a variable reference voltage control device having control means operable to vary said reference voltage,
   a linear operational amplifier coupled to both said correction voltage and reference voltage and having an output voltage which varies in response to differences between said correction and reference voltages,
   a series pass transistor in said electrical power circuit, the equivalent resistance of which is a function of said amplifier output voltage, arranged so that for any one reference voltage the current flow through said electrical power circuit is approximately constant, a pre-selector unit, an electronic clock coupled to the preselector unit, and a contactor circuit coupled to the batteries of said bank, so arranged that the clock controls said pre-selector unit to in turn actuate the contactors of said contactor circuit to sequentially scan the batteries of said bank and thereby periodically rest each said battery in turn while maintaining a plurality of batteries in the power circuit.

3. Electric power control system useful for controlling the torque of a direct current electric motor which forms portion of an electrical power circuit the power of which is derived from a bank of at least three batteries, comprising a pre-selector unit, an electronic clock coupled to the pre-selector unit, and a contactor circuit coupled to the batteries of said bank, so arranged that the clock controls said pre-selector unit to in turn actuate the contactors of said contactor circuit to sequentially scan the batteries of said bank and thereby periodically rest each said battery in turn while maintaining a plurality of batteries in the power circuit.

4. Electric power control system according to claim 3 wherein said scanning contactor circuit includes a device which is a rotary disc having contact bridging segments thereon, and solenoid driving means coupled thereto.

5. Electric power control system according to claim 4 wherein said disc carries on it a relatively movable selector contact and further solenoid driving means coupled thereto, the selector contact position with respect to the disc determining the number of batteries of said battery bank in circuit at any one time.

6. Electric power control system according to claim 2 wherein said contactor circuit includes a scanning device which is a rotary disc having contact bridging segments thereon, and solenoid driving means coupled thereto.

7. Electric power control system according to claim 6 wherein said disc carries on it a relatively movable selector contact and further solenoid driving means coupled thereto, the selector contact position with respect to the disc determining the number of batteries of said battery bank in circuit at any one time.

8. Electric power control system useful for controlling the torque of a direct current electric motor which forms portion of an electrical power circuit the power of which is derived from a bank of at least three batteries which are connected in series, comprising:

a selector in circuit with the batteries and operable to vary the number of batteries which are placed in circuit at any one time, thereby providing a voltage which varies in steps, an instantly variable constant current control circuit interposed between the batteries and the motor, providing a linear voltage control between said steps of voltage, said variable constant current control comprising a series pass transistor, a voltage drop sensing resistor, and a linear operational amplifier coupled as a variable current regulator, a potentiometer coupled to accelerator control means, and a circuit coupling the potentiometer and linear operational amplifier to the series pass transistor placing the series pass transistor into operation in a linear mode, and voltage comparator means coupled to the series pass transistor so as to sense voltage difference across said transistor and resistor, said voltage comparator means being so connected to said selector as to retain that number of said batteries in circuit which maintain said voltage difference within a workable range.

9. Electric power control system useful for controlling the torque of a direct current electric motor which forms portion of an electrical power circuit the power of which is derived from a bank of batteries, comprising:

a current sensing resistor in said power circuit having an output voltage which is a correction voltage which is proportional to current flow, a variable reference voltage control device having control means operable to vary said reference voltage, said variable reference voltage device being a potentiometer with a wiper arm and having a negative voltage applied at one end and a positive voltage applied at the other end, and manually operable means coupled to the potentiometer moving element movable to vary said reference voltage, the wiper arm of said potentiometer being coupled to a modifying circuit having rectifiers and an inverting amplifier arranged to modify the potentiometer output to provide a uniform control polarity each side of center of the potentiometer, the output of said modifier circuit being coupled by a conductor to said linear operational amplifier, a series pass transistor in said electrical power circuit and in series with said resistor, and an emitter circuit coupled to said series pass transistor, and a linear operational amplifier in the emitter circuit coupled to said series pass transistor, and coupled as a comparator to both said correction voltage and reference voltage and having an output voltage which varies in response to differences between said correction and reference voltages, and means interconnecting the output of said amplifier to the base of said transistor such that said output voltage controls the equivalent resistance of said transistor, the power circuit being arranged so that for any one reference voltage the current flow through said electrical power circuit is approximately constant.

10. Electric power control system according to claim 9 further comprising a pair of conductors extending across that part of said power circuit which includes said series pass transistor and resistor so as to detect voltage drop, a voltage comparator circuit having upper and lower reference voltages applied thereto, said pair of conductors being coupled to said comparator circuit, a logic circuit controlled by said comparators, and a series of contactors associated with respective batteries of said bank, so arranged that upon said voltage drop exceeding the upper comparator reference voltage one battery is removed from the battery circuit of said bank, and upon said voltage drop being less than the lower comparator reference voltage one battery is added to said battery circuit.

* * * * *